March 5, 1929.  H. S. BROOM  1,704,240
ROTARY COMPRESSOR, PUMP, AND THE LIKE
Filed Dec. 30, 1926  2 Sheets-Sheet 2
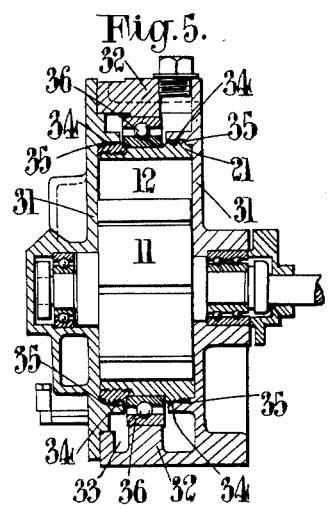
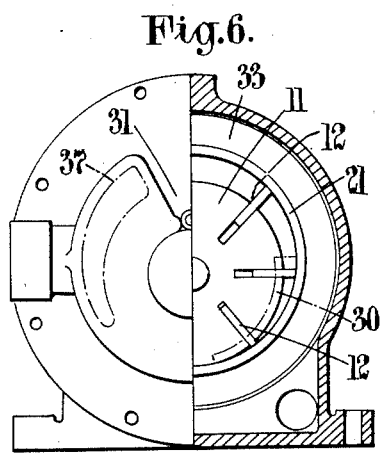
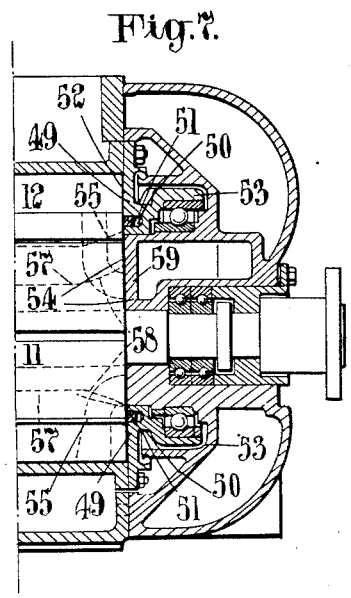
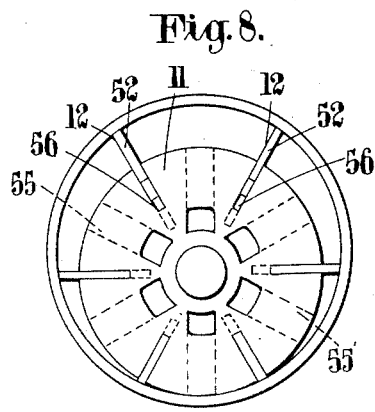
INVENTOR
Harry Sheet Broom
BY
B. Linger
ATTORNEY Patented Mar. 5, 1929.

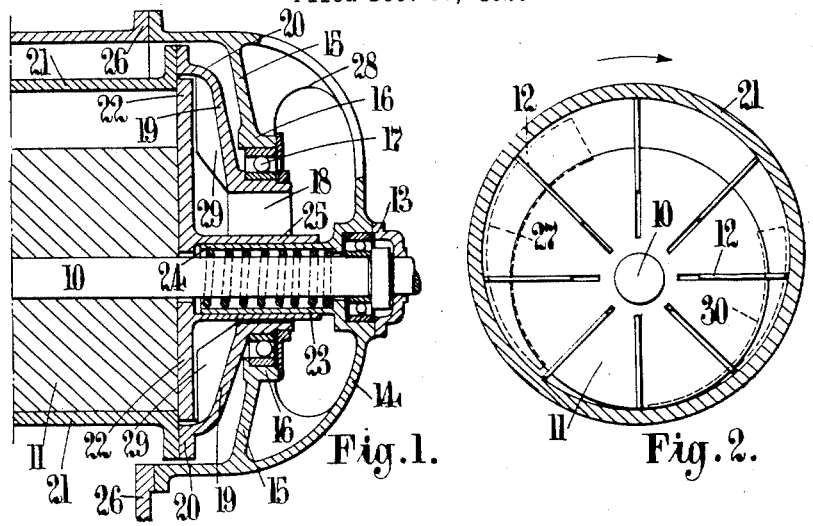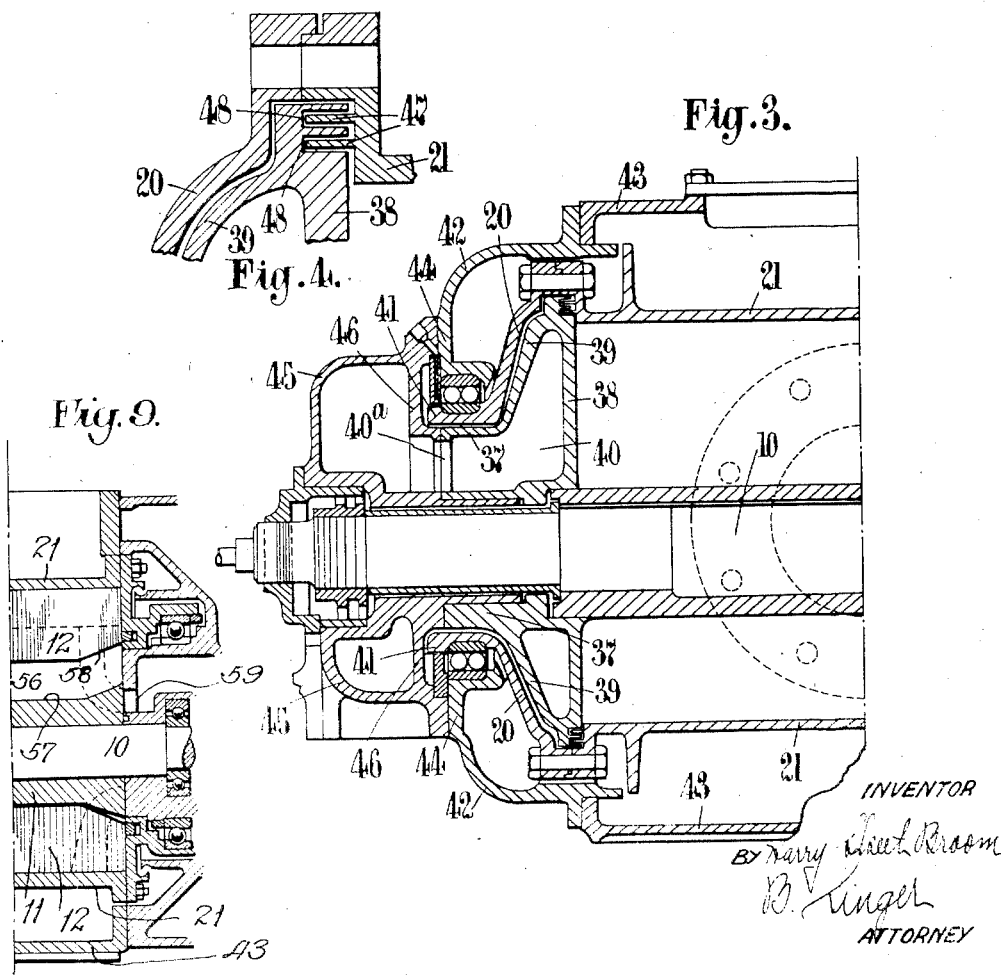

1,704,240

UNITED STATES PATENT OFFICE.

HARRY SKEET BROOM, OF HIGH WYCOMBE, ENGLAND.

ROTARY COMPRESSOR, PUMP, AND THE LIKE.

Application filed December 30, 1926, Serial No. 158,050, and in Great Britain February 23, 1926.

This invention relates to rotary compressors, pumps, exhausters and the like and has for its object to provide such devices of an extremely efficient character which are simple in construction and cheap to manufacture.

In general rotary compressors and the like constructed according to the invention comprise a drum or cylinder supported so as to be freely rotatable on its own axis, and surrounding a rotor whose axis is parallel to but not coincident with the axis of the cylinder and the surface of which at one point comes closely adjacent or substantially in contact with the inner surface of the cylinder, the rotor having a number of projecting, preferably radially, and sliding vanes whose outer edges come into contact with the interior surface of the rotating cylinder. Means are provided for closing in the open ends of the rotatable cylinder and the vanes extend to these means, so that the crescent shaped space between the outer surface of the rotor and the inner surface of the cylinder is divided into a number of chambers by the vanes. These chambers are gradually created, attain a maximum and then disappear in the course of one rotation. Means are provided for admitting fluid through the closed ends or one closed end of the rotating cylinder during the creation of the chambers and other means in one or both closed ends for permitting the delivery of the fluid from these chambers during their shrinkage and final disappearance. Suitable bearings are provided at the ends for the shaft of the rotor which is furnished with driving means and other bearings for the rotatable cylinder or parts carried thereby at the ends or in other suitable position or positions. The cylinder may be caused to rotate by the frictional engagement of the outer edges of the blades or in some cases, it as well as the rotor, may be driven in the same direction at the same or different speeds. End casings, frameworks or the like may be provided for supporting the bearings and the inlet and outlet devices, and these frameworks or devices may be connected by a bed or base. In addition they may be connected at the top or in an intermediate position for example by a protector framework or casing which encloses or partly encloses the rotating cylinder.

Means may be provided for keeping the air or other fluid, which is delivered under pressure, or which enters the intake, in the case of exhausters and vacuum pumps, clear of the rotatable cylinder or drum or carrier therefor at the pressure or delivery end or intake end of the machine as the case may be or both, to avoid setting up end thrust in the rotatable cylinder or drum owing to unbalanced pressure at each end of the machine, which would otherwise result. For this purpose the delivery port at the pressure end of the machine or the intake, or both, are enclosed or covered in to keep the delivered or entering fluid, or both, clear of the rotary cylinder or its carrier and the port or inlet communicates with a conduit or conduits leading to the outlet from the machine or to the interior thereof as the case may be.

Means for preventing leakage of the air or other fluid past the sliding vanes are provided. Such means may be as desired, may comprise means for opposing a contrary or back pressure to balance the possible leakage, or may consist in so constructing the vanes and the surfaces against which the edges or ends thereof slide that the said surfaces move with the freely rotating drum or cylinder, preferably having combined therewith packing means of any desired nature between them and the driven rotor. In this latter case the inlet and outlet to the chambers between the vanes which come in the closed end or ends of the rotatable drum or cylinder are close to the centre of rotation. With this construction also the inlet or outlet or both are adapted to coincide with the inlet or outlet passages in the body of the rotor between the vanes and in this manner communication is established between the inlet or outlet and the chambers between the vanes. The inlet and outlet are suitably disposed in one or both ends of the machine and in desired angular relationship with each other according to the disposition of the chambers between the vanes.

In some cases the devices for opposing back pressure to the possible leakage may be combined with the structural devices as generally described for the same purpose.

The bearings for the rotatable drum or cylinder or parts carried thereby may come at the ends or other suitable position or positions and with some forms of apparatus the drum may be mounted directly in the inner race of a large ball bearing or may be directly mounted on one or more roller or ball bearings suitably supported by an outer frame or main casing.

In order that the invention may be better understood it will now be described with reference to the accompanying drawings in which:—

Fig. 1 is a fragmentary sectional elevation of one end of a pump, compressor or the like constructed according to one method of carrying the invention into effect.

Fig. 2 is an end elevation of the rotor, vanes and rotating drum or cylinder, shewn in Fig. 1.

Fig. 3 is a similar view to Fig. 1 but shewing another method of carrying the invention into effect.

Fig. 4 is an enlarged view of the "packing" means between the rotating drum and the fixed end plates, in the form of the invention shewn in Fig. 3.

Fig. 5 is a sectional elevation of another form of pump constructed according to the invention.

Fig. 6 is an end elevation partly in section of the form of the pump shewn in Fig. 5.

Fig. 7 is a similar view to Fig. 1 but shewing a further method of carrying the invention into effect.

Fig. 8 is a fragmentary sectional end elevation of Fig. 7.

Fig. 9 is a detail view.

Referring to Figs. 1 and 2 the particular form of compressor or blower therein shewn comprises a rotor shaft 10 carrying a cylindrical rotor 11 and a number of radially sliding vanes 12 arranged at equi-angular distances apart. The rotor shaft 10 projects some distance at each end and is supported by ball or other suitable bearings 13 carried by circular dished end plates or covers 14 so that the bearings 13 come in eccentric positions with respect to the dished covers. These covers have internally projecting arms 15, or a ring formed with a housing 16 for the outer race of a large ball bearing 17 which is concentric with the cover 14. In the inner race is mounted a sleeve 18 through which the rotor shaft 10 passes eccentrically, where it comes intermediate the rotor and the bearing of the shaft. This sleeve is extended into a disc or ring 19 which comes at a slight angle to the vertical and is then bent to the horizontal where it is formed with a vertical flange. This sleeve and ring device forms a cylinder or drum carrier 20 and is freely rotatable in its large ball bearing.

A revolving cylinder or drum 21 with end flanges is arranged around the rotor 11 and vanes 12 and its flanges bolted or otherwise fastened to the flanges of the carriers 20. The lowermost portion of the rotor 11 comes into contact with or closely adjacent the lowermost portion of the internal surface of the cylinder or drum 21 and the vanes 12 extend from the rotor and contact with the said internal surface.

At each end of the rotor and cylinder a non-rotatable port plate 22 is mounted around the rotor shaft. Each plate 22 is circular and extends to the outer end of the cylinder or drum 21 as shewn and makes contact therewith at the outside, leakage being prevented by serrations, labyrinth packing, or other suitable devices. Each port plate 22 is in the form shewn allowed a slight movement endwise and is kept in contact with the rotor by means of a compression spring 23. This surrounds the shaft and comes within a sleeve 24 projecting inwardly from the rotor bearing, a sleeve 25 projecting outwardly from the port plate coming over the first mentioned sleeve so as to be slidable thereon but prevented from rotation. The spring structure in some forms may be dispensed with.

The dished end covers 14 may be supported in any suitable manner and attached to a suitable bed. As shewn they are formed with flanges which are bolted to the flanges of a casing or framework 26 spaced from and surrounding or partly surrounding the revolving cylinder 21.

At the suction or inlet end the port plate 22 is formed with a port 27 or with ports of suitable shape and position, to allow the passage of air or other fluid to the compartments forming between the vanes, the air entering through large openings or lightened portions 28 on the end cover. The diaphragm or drum carrier 20 at this suction end may be provided with fan vanes 29 which will give an initial pressure to the air supplied and thus increase the capacity of the machine.

The port plate on the delivery side (not shewn in the drawing) has a port 30 or ports of suitable shape and disposition for the passage of the air from the compartments as they become smaller in size and finally disappear.

Figs. 5 and 6 shew a form of the rotary compressor or the like made according to the invention which comprises means for opposing a contrary or back pressure to balance possible leakage. In this form the rotor 11 with its associated sliding vanes 12 is eccentrically mounted with respect to an encircling freely rotating drum or cylinder 21 in a manner previously explained. In place however of providing special port plates 22 for closing in the open ends of the rotary cylinder the fixed framework carrying the bearings of the rotor shaft 11 is formed with side plates 31 coming against and closing in the open ends of the rotary cylinder 21. One or both of these side plates is or are formed with the inlet port 37 or outlet port 30 to the chambers. These ports are suitably shaped and as shewn in Fig. 6 disposed relatively to the chambers and to each other and may be of somewhat elongated form in a circumferential direction.

These side plates 31 are so formed that portions or extensions 32 thereof combine to form a somewhat annular chamber 33 surrounding the rotary cylinder 21. Inwardly projecting flanges 34 are provided on the side plates 31 to project over the exterior of the ends of the rotary cylinder 21 and the inner surfaces of these flanges come adjacent screw threaded portions 35 on the exterior of the rotary cylinder 21. The crests of the threads of these screw threaded portions have a very slight clearance from the surfaces of the flanges 34 which come adjacent thereto and the screw thread on one side is right handed whilst the screw thread on the other side is left handed.

The annular chamber 33 surrounding the rotary cylinder is kept supplied with oil of a desired consistency and the direction of rotation of the apparatus is so chosen that the action of the screw threads on the exterior of the rotary cylinder 21 is such that oil is forced along the said threads under pressure to the outer ends of the cylinder which run in contact or substantially in contact with the inner surfaces of the fixed side plates 31. The pressure oil thus fed in opposes any leakage past the ends of the cylinder.

With this form of construction and with any other desired and suitable form the rotary cylinder 21 may be carried as shewn by an encircling ball, roller or other bearing 36 so that it rotates in the said bearing, or in place of a single bearing more than one may be provided in suitable positions. For large cylinders or drums, suitably arranged and positioned roller bearings or the like which do not encircle the cylinder or drum may be provided for the same purpose.

In Figs. 3 and 4 the compressor comprises a port plate at the pressure end formed from a casting or the like. This casting has a central sleeve portion 37 through which the rotor shaft 10 passes and at one end adjacent the rotor 11 has a flat plate portion 38 forming the port plate proper. This port plate 38 is circular and extends to co-operate with the flanged portion of the rotary cylinder or drum 21 the parts in this position having co-operating baffle means as hereafter described. The casing has another wall 39 spaced from and at a slight angle to the port plate 38 which joins the port plate 38 in a curved portion at its greatest diameter and which merges into the sleeve 37 towards the centre. The port or ports in the port plate (not shewn in the drawing) open into the hollow interior 40 of the casting thus formed. An outlet or outlets 40ª from the hollow interior of the casting is provided above the sleeve and at this portion the casting comes within and may be concentric with the sleeve like portion 41 of the carrier 20 for the cylinder or drum 21 which sleeve portion 41 of the carrier is mounted to rotate in the inner race of the large ball bearing supported by the inwardly extending flange or diaphragm.

The cover for the parts and carrying the bearing for the rotor shaft 10 is made at this end in two portions which are attachable. An inner portion 42 which is bolted to the outer casing or base framework 43 and which has formed integrally therewith the inwardly extending flange or diaphragm 44 carrying the large ball bearing and an outer portion 45 which has the air outlet therein and which carries the bearing for the rotor shaft 10 and has an interior ring-like channel portion 46 for closing in the annular space between the flange or diaphragm before referred to and the exterior of the hollow port plate casting together with a port or ports forming extensions of the conduits for air from the ports in the port plate.

In the closed annular space between the ring or diaphragm and the exterior of the hollow port plate the carrier 20 for the rotary cylinder or drum 21 is located and it will be appreciated that the air under pressure delivered through the port plate does not come into contact therewith as this carrier 20 is enclosed and shielded by the outer part 39 of the port plate, the ring or diaphragm and the ring like channel portion of the outer casting.

The baffling means employed between such port plate and the adjacent part of the rotary cylinder or drum are preferably as shewn in Fig. 4. In this figure a number of concentric and spaced rings or projections 47 are provided on the flanges of the rotary cylinder or drum 21 and may be formed integral therewith, projecting into a number of co-operating concentric and spaced channels 48 on the fixed port plates 38, the arrangement being such that the rings 47 do not touch the sides or bases of the channels 48, further the flanges of the rotary cylinder or drum preferably do not touch the port plates. The rings in some cases may be on the port plates and the channels on the flanges or each part may have both rings and channels.

An exhauster or vacuum pump can be constructed generally similar to the compressor described except that the intake will be enclosed; to enable the same machine to be used both for compression and exhaustion both the inlet and outlet can be enclosed and the construction at each end of the machine be generally similar.

Another and preferred particular form of compressor or the like made according to the invention is shewn in Figs. 7 and 8 and comprises ring-like side plates 49 attached to one or both ends of the rotary cylinder or the like 21 and projecting inwardly as flanges or the like as shewn. These ring-like side plates extend inwardly to a sufficient extent to overlap the ends of the rotor 11 a desired amount in every relative position of the rotor. The overlapping portion is provided with an annular or circular recess 50 in which is located a packing ring 51 of metal or other suitable material kept pressed into contact with the end surface of the rotor 11 by suitable springs or the like not shewn. By this construction it will be seen that the side ends or edges 52 of the vanes 12 which project from the rotor 11, work in contact with the inner surfaces of the ring-like side plates 49 which rotate with the cylinder or drum 21. It will also be understood that any possible leakage has to pass by the spring pressed packing 51 between the said ring-like side plate and the end of the rotor.

The ring-like side plate at one or both sides is made to turn around a fixed casting or the like 59 formed with means for carrying the ball or other bearing or bearings for the rotor shaft. This fixed casting also carries one portion of the bearings for the rotary cylinder or the like the other portions of which are carried by extensions 53 from the ring-like side plates 49. The fixed castings at the ends are also preferably so shaped for example as shewn, that they completely enclose the bearings for the rotary cylinder or the like.

The ends of the rotor except those portions which are overlapped by the inwardly projecting ring-like end plates come into contact with portions 54 of the fixed castings around which the ring like side plates 49 rotate and in suitable positions this casting is provided with suitably shaped inlet and outlet ports.

Alternatively the casting containing the suitably shaped inlet and outlet ports may be made as a separate piece from the fixed end casing and be held in contact with the face of the rotor by springs or the like or by air pressure arranged to operate on the back of the casting containing the inlet and outlet ports.

The rotor, in portions coming between the vanes is also formed with passages or conduits 55 adapted to coincide with the inlet and outlet ports in suitable positions. These conduits 55 at one extremity come in the end or ends of the rotor as shewn and at the other extremity come on the surface thereof between the vanes 12. To prevent leakage from the inlet or outlet ports in the fixed casting, into or through the slots or recesses 56 in the rotor 11 in which the sliding vanes 12 are mounted when the ends of these slots or recesses 56 in the rotation of the rotor pass by the said inlet or outlet ports in the casting, the lower bounding surfaces 57 of such slots or recesses 56 are shaped so that they do not open into or communicate with the said inlet or outlet ports. For this purpose the lower surface of these openings or recesses towards the ends are curved away from the centre of rotation of the rotor as shewn at 58 to such an extent that at their extremities they come radially further from the centre of the rotor than the outermost extremities of the inlet or outlet ports 59. This is shown in detail in Figure 9.

In some cases where the ring-like side plates 49 attached to the rotary cylinder 21 come around the casting carrying the bearings for the rotor and the said rotary cylinder, the said ring-like side plates or the adjacent surfaces of the casting may be provided with screw threads of opposite hand at each side of the machine so that oil located in the casting which surrounds the bearings of the rotary cylinder may be forced by the rotary action through the screw threads to oppose a contrary pressure to any possible leakage, the construction resembling that shewn in Figs. 5 and 6.

With all the forms of the invention it should be understood that the inlet and outlet to the chamber can be formed in one end or in both ends. In some cases the inlet can come in one end whilst the outlet is arranged in the other end. It should also be fully understood that in all cases the inlet and outlet of the fluid take place through the open ends of the rotary cylinder or drum.

The invention is not limited to the precise forms or details of construction described as these may be varied to suit particular cases.

Having now particularly described and ascertained the nature of my said invention and in what manner the same is to be performed, I declare that what I claim is:

1. In a rotary pump a main casing, means for supporting ball bearings at each end of the said casing, a hollow cylinder in said casing, inwardly projecting flanges at each end of the said hollow cylinder, sleeves formed with the said inwardly projecting flanges, ball bearings located between the sleeves and the means for supporting ball bearings in connection with the casing so as to permit the cylinder freely to rotate about its own axis, bearings formed with the casing, a shaft mounted in said bearings, a rotor mounted on and concentric with the said shaft and disposed within the freely rotating cylinder, the axis of the rotor and the shaft being parallel to and out of coincidence with the axis of the cylinder and the circumferential surface of the rotor at one point coming substantially into contact with the inner circumferential surface of the cylinder, a number of radially arranged slots in the rotor extending parallel to the axis thereof, a number of sliding vanes mounted in the said slots, the outer edges of which vanes are adapted to extend to and contact with the inner circumferential surface of the freely rotating cylinder, means for closing the open ends of the freely rotating cylinder so that the crescent shaped space between the outer circumferential surface of the rotor and the inner circumferential surface of the cylinder is divided into a number of chambers by the vanes, port plates connected to the casing arranged at each end of the freely rotating cylinder and the rotor, ports in the port plate for communicating with the chambers between the blades, inlet means in the casing in connection with the port in one port plate, and outlet means in the casing in connection with the port in the other port plate.

2. A rotary pump as claimed in claim 1, in which the inwardly projecting flanges of the freely rotating cylinder act as closures for the chambers between the blades and overlap the ends of the rotor in all relative positions, packing means being provided between these overlapping portions and the rotor.

3. A rotary pump as claimed in claim 1, in which passages are provided through the rotor to cause the ports in the port plate to be put into communication with the chambers between the blades at appropriate times, and in which the ends of the radial slots in the rotor are prevented from coming into coincidence with the ports.

In witness whereof I affix my signature.

HARRY SKEET BROOM.